June 5, 1951

E. W. MENNIE 2,555,453

UNIVERSAL SHRINK RULE

Filed May 6, 1946

INVENTOR.
Edward William Mennie.
BY
Harness, Dickey & Pierce
ATTORNEYS.

Patented June 5, 1951

2,555,453

UNITED STATES PATENT OFFICE 2,555,453

UNIVERSAL SHRINK RULE

Edward William Mennie, Windsor, Ontario, Canada, assignor to Howard H. Crawford, Detroit, Mich.

Application May 6, 1946, Serial No. 667,506

6 Claims. (Cl. 235—61)

This invention relates generally to calculating means and more specifically toward slide rules for calculating changes in dimension in a material when the material is subjected to different degrees of intensity of the same physical condition.

An object of this invention is to provide a slide rule for indicating the dimensions of an article under a given degree of intensity of a physical condition when the dimension of the article is known under the same physical condition but at a different degree of intensity of this same physical condition.

Another object is to provide, in such a rule, means whereby the rule may be adjusted for the particular change in dimension of any material with which it might be used or for any degree of intensity change of various physical conditions for which it might be desired to be used.

Another object is to provide such a rule by which, when a dimension of an object at one temperature is known, the dimension of the object at a second temperature may be quickly and easily determined.

Another object is to provide such a rule in which changes in dimension caused by changes in temperature may be geometrically determined.

Another object is to provide such a rule which is simple to use and accurate in results.

Another object is to provide such a rule which is simple and economical of manufacture and has a minimum of parts.

Other objects will be apparent from the drawing, specification, and appended claims.

In the drawings,

Fig. 1 is a view in elevation of a rule embodying the invention,

Fig. 2 is a plan view of the rule shown in Fig. 1,

Fig. 3 is a view taken substantially along the lines 3—3 of Fig. 2, and

Fig. 4 is a view showing diagrammatically the geometry involved in the rule.

Referring to the drawings, numeral 1 indicates generally a shrink rule comprising a first elongated rectangular bar or supporting member 2, a second elongated rectangular bar 4, and slidable indicating members or fingers 6 and 8 on the bars 2 and 4 respectively. Adjacent one end of the bar 2 is a base point or zero point 10 for indicia means 12 which extends along the bar 2 from the base point 10 toward its other end 14. The bar 2 has a perpendicularly extending finger 16 having a measuring face 18 aligned exactly above the base point 10 and facing the end 14 of the bar 2 which cooperates with the indicating finger 6. Finger 6 has an aperture 20 therethrough in which the bar 2 is received so that the indicating finger 6 may be reciprocally moved along the bar 2 toward and away from finger 16. A measuring face 22 extends above the bar 2 and faces the measuring face 18 and the spacing between faces 18 and 22 represents the dimension of an article under one degree of intensity of a physical condition such as temperature. The faces 18 and 22 extend perpendicularly to the longitudinal centerline AB (see Fig. 4) of the bar 2 along which the indicia means 12 extends. The face 22 also extends down over the bar 2 for cooperation with the indicia means 12.

The rectangular bar 4 has one end portion 24 fulcrumed to the bar 2 at the base point 10 by a bolt or screw 26 extending through aligned apertures in the bars 2 and 4. The bars 2 and 4 are spaced from each other and held in parallel alignment by a washer 27 carried on screw 26 intermediate the bars 2 and 4 which are clamped thereagainst between the head 28 and thumb nut 30 of screw 26. The other end 34 of the bar 4 has an extending arm 36 overlying the end 14 of the bar 2 which is radially curved about the screw 26 as a center and bears suitable indicia upon one face thereof co-operable with a zero mark carried by the end portion 14 of the bar 2 whereby the included angle between the bars 2 and 4 may be adjusted. This angle, as will be described hereinafter, is proportional to change in dimension of the object by a change in degree of intensity of a physical condition of the object, as, for example, the inches per foot when the temperature of the object is changed from one predetermined temperature to a second predetermined temperature. Suitable thumb-screw means 35 carried by end 14 of bar 2 selectively holds the arm 36 whereby the desired angle between the bars 2 and 4 may be maintained.

The position of the finger 8 on its rod 4 is determined by the engagement of its straight edge surface 37 with a semicircular abutment member 38 carried by the indicating finger 6 and having its center of curvature lying in the plane of the face 22 and on the line AB. The indicating finger 8 is similar to the finger 6 in that it has an aperture 40 extending therethrough for receiving the bar 4 so that the finger 8 may be reciprocably moved thereon. The finger 8 has a windowlike opening 42 through which indicia 44 on the bar 4 may be viewed. A vernier scale 46 on finger 8 adjacent the opening 42 cooperates with the indicia 44 whereby the position of the finger 8 on the bar 4 may be accurately observed. The straight edge portion 37 which abuts against the semicircular surface portion 50 of the member 38 is arranged to extend perpendicularly to a longitudinal centerline AC (see Fig. 4) of bar 4 which crosses the longitudinal centerline AB of bar 2 at the axis of rotation of bars 2 and 4 on screw 26. The zero point 52 of the indicia 44 is spaced from the center A of the bolt 26, at which point AC and AB cross, a distance equal to the radius of the semicircular abutment member 38 plus the distance of the zero point of the scale 46 from the straight edge surface portion 37.

Referring now to Fig. 4, it will be evident that the centerlines AB and AC of the bars 2 and 4 and a line FG (perpendicular to AC joining the lines AB and AC) cooperate to form a right-angle triangle AFG. The line FG intersects the line AB at the point where the measuring face 22 crosses the centerline of the bar 2 and the indicia means 12 lying therealong. Therefore, if the angle BAC is proportional to the change in length of the material when its temperature is changed a predetermined amount, a distance AG measured off on the line AB will have the same ratio to the line AF measured off on the line AC that the dimension of the material at the predetermined changed temperature will have to the dimension of the material at the first temperature. Since, mechanically, it is sometimes desirable to have the finger 8 located on the line FG, it is displaced as shown on the drawings, and its face 37 forms the line DE which extends perpendicularly outwardly from the line AC and abuts tangentially against the semicircular surface portion 50 of the semicircular abutment member 38 as at H. Since lines FG and DE are both perpendicular to the line AC, these lines are parallel and perpendicular to line FD; and, since the line GH is the radius of the semicircular member 38 drawn at the point of tangency of DE with member 38, GH is therefore perpendicular to the line DE, and the lines FD and GH are parallel. These lines FD and GH are parallel to each other and drawn between parallel lines FG and DE, and therefore the distance FD is equal to the distance GH. This is true irrespective of the angle BAC.

The distance DI is equal to the distance of the zero point of the scale 46 from the straight edge portion 37 of the finger 8.

J represents the zero point of scale 46, and the distance JI should always be equal to the distance AF. Therefore the point J is displaced along the line AC a distance FI from the intersection of the lines AB and AC. In like manner, the zero point 52 of the indicia 44 is displaced from the center of the bolt 26 a distance equal to the radius of the semicircular abutment member 38 plus the distance from the straight edge portion 37 to the zero point of the scale 46. The reading of the scale 46 on the indicia 44 will therefore give a true reading for all angles between bars 2 and 4 equal to the distance AF. It will be evident that starting with the dimension of the piece at either the hot temperature or the cold temperature, the length of the piece at the other temperature will be indicated as follows, and assuming first that we start with the dimension of the piece at the higher temperature. The angle between the bars 2 and 4 is set by means of indicia on the arm 36 and locked in position by thumb screw means 35 at the correct expansion ratio which may be inches per foot for the material selected between the two temperatures under consideration. The dimension of the piece at the higher temperature is laid off between the measuring faces 18 and 22 either by use of the indicia means 12 on the rod 2 or by placing the measuring faces 18 and 22 adjacent the hot piece or the mold in which the piece is to be cast. The finger 8 is then moved toward the screw 26 along the rod 4 until the straight edge portion 37 is in engagement with the semicircular surface 50 of the abutment member 38. The indicia reading on the scale 44 will then be a direct reading of the length of piece at the lower temperature.

It may now be seen that this construction provides a simple and convenient way of determining the dimension of the member at a second temperature when a dimension of the member at one temperature is known by a direct indicia reading when the known expansion or contraction per foot of the material of which the piece is made is properly set on the instrument for the temperature change under consideration. It will also be evident to those skilled in the art that this device may be used for determining the length of a member under various other physical conditions, for example, changes in length of a member under changes in stress or strain when the expansion or contraction per unit of the material is known for the change in force upon the member.

Since other detailed arrangements will, upon a reading of the specification, become apparent to one skilled in the art, it is not desired to limit the scope of this invention to the particular arrangement disclosed, but the invention is intended to be limited only by the scope of the appended claims.

What is claimed and is desired to be secured by United States Letters Patent is as follows:

1. In a measuring device, an elongated supporting member, a first abutment member carried by said supporting member in fixed relation thereto, a movable abutment member carried by said supporting member and operable to be moved to and away from said fixed abutment member, an elongated arm extending at an angle with respect to said elongated member, means pivotally securing said arm to said elongated member, an indicating member carried by and movable relative to said arm and having a portion engageable with said movable abutment whereby the position of said movable indicating member on said arm may be determined by the position of said movable abutment on said elongated member, and indicia means on said arm for indicating the position of said indicating member.

2. In a device of the character described, an elongated member, indicia on said member proportional to length, a base point for said indicia, a movable indicating member slidable along said elongated member and co-operable with said indicia whereby said indicating member may be positioned along said elongated member a distance from said base point proportional to a given length, a second elongated member fulcrumed on said first-named elongated member at said base point, indicia on said second elongated member proportional to length, a second movable indicating member slidable along said second elongated member and having a portion positioned in the path of movement of said first-named indicating member, said second movable member when in engagement with said first-named indicating member being co-operable with said second elongated member indicia to indicate a measured length along said second elongated member proportional to the distance of said first-named indicating member from said base point.

3. In a device of the character described, an elongated member, indicia on said member proportional to length, a base point for said indicia, a movable indicating member slidable along said elongated member and having a portion co-operable with said indicia whereby said indicating member may be positioned along said elongated member a distance from said base point proportional to a length, a second elongated member pivoted on said first-named elongated member at said base point, indicia on said second elongated member having the same relation to length as said first-named indicia, a base point for said second-named indicia, a second movable indicating member slidable along said second elongated member and having a portion co-operable with said second-named indicia whereby said second indicating member may be positioned along said second elongated member a distance from said second-named indicia base point proportional to a length, said second indicating member having a portion extending outwardly therefrom toward said first-named elongated member, and abutment means carried by said first-named indicating member and having a surface engageable by said second-named indicating member extending portion, said second-named base point being displaced along said second-named elongated member from said first-named base point a distance equal to the distance along said first-named elongated member of said surface from said co-operating portion on said first-named indicating member plus the distance that the zero point co-operating with said second-named indicia is displaced along said second elongated member from the surface of said extending portion engageable with said surface whereby when said second movable member is in engagement with said surface said second-named indicating member is co-operable with said second-named indicia to indicate a measured length along said second elongated member from said second-named base point proportional to the distance of said first-named indicating member from said first-named base point.

4. In a device of the character described, an elongated member, indicia on said member proportional to length, a base point for said indicia, a movable indicating member slidable along said elongated member and having a portion co-operable with said indicia whereby said indicating member may be positioned along said elongated member a distance from said base point proportional to a length, a second elongated member pivoted on said first-named elongated member at said base point, indica on said second elongated member having the same relation to length as said first-named indicia, a base point for said second-named indicia, a second movable indicating member slidable along said second elongated member and having a portion co-operable with said second-named indicia whereby said second indicating member may be positioned along said second elongated member a distance from said second-named indicia base point proportional to a length, said second indicating member having a portion extending outwardly therefrom toward said first-named elongated member, and abutment means carried by said first-named indicating member and having a semicircular surface engageable by said second-named indicating member extending portion with its center of curvature at said first-named movable member portion, said second-named base point being displaced along said second-named elongated member from said first-named base point a distance equal to the radius of said abutment means plus the distance that the zero point co-operating with said second-named indicia is displaced along said second elongated member from the surface of said extending portion engageable with said surface whereby when said second movable member is in engagement with said surface said second-named indicating member is co-operable with said second-named indicia to indicate a measured length along said second elongated member from said second-named base point proportional to the distance of said first-named indicating member from said first-named base point.

5. In a device of the character described, a first element, means establishing a base point on said element for measuring, a member movable along said element relative to said point whereby a length may be measured off on said element from said base point proportional to a dimension of a material when the material is subjected to a physical condition affecting its dimensions, means supporting a second movable member for movement in a second direction toward and away from said base point, means movable with one of said movable members and cooperable with the other of said movable members to determine the position of a first of said movable members when a second of said movable members has been moved to measure off a first length whereby said first movable member will assume a position in which the length measured thereby is a function of said first length, means determinging the angle between said directions as a function of the change in dimension per unit of change in the physical condition whereby said second length indicates the dimension of the material when it is subjected to the same physical condition but in a different degree.

6. In a measuring device, an elongated supporting member, a pair of spaced abutments carried by said supporting member and having work-measuring portions, one of said abutments being arranged to define a base point on said member, the other of said abutments being movable relative to said elongated supporting member whereby a first length may be measured along said member from said base point equal to a dimension of a workpiece subjected to a characteristic of a first magnitude, an elongated arm extending at an angle with respect to the path of movement of said movable abutment and intersecting said supporting member at said point, an abutment member carried by said movable abutment, a follower member carried by said arm and engageable with said movable abutment member to measure a second length along said arm, and means for setting said angle between said arm and said elongated member in accordance with the coefficient of change in dimension per unit change in a physical characteristic of the material being measured when changing from a first to a second magnitude whereby said second length is equal to the dimension of said first length at said second magnitude.

EDWARD WM. MENNIE.

REFERENCES CITED

The following references are of record in the file of this patent:

UNITED STATES PATENTS

| Number | Name | Date |
| --- | --- | --- |
| 462,234 | Brotherhood | Nov. 3, 1891 |
| 2,300,448 | Ludwig | Nov. 3, 1942 |
| 2,301,068 | Morgan | Nov. 3, 1942 |